United States Patent [19]

Daniel

[11] 4,041,183

[45] Aug. 9, 1977

[54] METHOD FOR THE FORMATION OF ARTICLES FROM COLLAGENOUS MATERIAL

[76] Inventor: Leonard Daniel, 44 Budyan Road, Grays Point, New South Wales, Australia

[21] Appl. No.: 596,605

[22] Filed: July 17, 1975

Related U.S. Application Data

[63] Continuation of Ser. No. 395,943, Sept. 10, 1973, abandoned.

[30] Foreign Application Priority Data

Sept. 18, 1972 Australia .............................. 462/72

[51] Int. Cl.$^2$ ............................................. B65D 81/34
[52] U.S. Cl. .................................... 426/105; 426/135; 426/276
[58] Field of Search ............... 426/573, 135, 415, 276, 426/92, 105, 138; 138/118.1

[56] References Cited

U.S. PATENT DOCUMENTS

| | | | |
|---|---|---|---|
| 2,802,744 | 8/1957 | Weingand | 426/277 |
| 2,813,034 | 11/1957 | Weingand | 426/277 |
| 2,988,451 | 6/1961 | Zahn | 426/140 |
| 3,494,773 | 2/1970 | Courts | 426/140 |
| 3,503,769 | 3/1970 | McDowell | 426/169 |
| 3,523,027 | 8/1970 | Hall | 426/140 |
| 3,533,817 | 10/1970 | Shank | 426/138 |
| 3,582,357 | 6/1971 | Katz | 426/169 |

FOREIGN PATENT DOCUMENTS 962,483 7/1964 United Kingdom

OTHER PUBLICATIONS

Properties of Alginates, McDowell, (1972), Alginate Industries Limited, pp. 1-61.
Properties of Alginates, R. H. McDowell, Alginate Industries Limited, pp. 30, 31, 36, 38, 42, 43 and Foreword (1972).

*Primary Examiner*—Hiram H. Bernstein
*Attorney, Agent, or Firm*—Robert W. Turner

[57] ABSTRACT

A method of forming a collagenous article comprising mixing a dispersion of collagenous material with an ester of alginic acid, forming the article, and rendering the mixture sufficiently alkaline for sufficiently long to set the mixture.

32 Claims, No Drawings

METHOD FOR THE FORMATION OF ARTICLES FROM COLLAGENOUS MATERIAL

This is a continuation, of application Ser. No. 395,943 filed September 10, 1973 and now abandoned.

The present invention relates to a method of binding together collagenous materials; a method of forming articles from collagenous pastes, slurries or dispersions; and to articles so formed.

A major constituent of connective tissue is collagen, an inherently very tough proteinaceous material which exhibits the properties of strength with little stretch. Collagen exists as fibres; in skin these fibres are woven into networks constituting fibre bundles, the fibres being maintained in the bundle by interfibrillar cement. Individual collagen fibres are made up of fibrils; collagen fibrils typically have a length of the order of 2 mm while the fibres are naturally much longer and of greater diameter. Cowhide collagen fibres typically contain hundreds, or even thousands of individual fibrils.

The desirable natural properties of collagen, such as its strength and wear resistance, have long been recognised. There have been limitations to its use due to the fact that it is extremely difficult to effectively take apart a natural collagen tissue and to reform it into some other shape. One particular use to which collagenous material has been put is as sausage casings; natural casings from animal intestines, which are mainly collagen, have traditionally been used in the manufacture of sausage; due to the scarcity, and hence cost, of high quality intestines numerous attempts have been made to find an effective method of "taking apart" naturally occurring, collagenous materials such as hide and "reforming" it into e.g. a thin walled tube which can be used as an artificial sausage casing. The present invention is, in one aspect, directed to the step of "reforming" pastes, slurries or dispersions of collagenous materials into articles having desired shapes e.g. tubes, threads, or the like. The pastes, slurries, or dispersions forming the starting material of the present method may be formed in any known way such as by acid swelling, or by mincing and colloid milling. The collagenous material may be present as fibrils, fibres or fibre bundles and the collagen may be either native or denatured; it is advantageous, however, to use as the starting material a collagenous dispersion formed by the method of the applicant's copending patent application entitled "A method of forming collagen dispersions filed Sept. 10, 1973, Ser. No. 395,994, now U.S. Pat. No. 3,894,132, issued July 8, 1975."

In another aspect the present invention is useful for binding collagenous materials together. These collagenous materials include not only the pastes, slurries and dispersions referred to above but also larger places of collagenous material such as ribbons of natural intestine which it is desired to bind together to form racquet strings. Similarly loose collagen fibres may be anchored to a hide substrate during leather manufacture using a process according to the present invention. At an intermediate level tissue webs formed by loosening the collagen fibres of a natural product, with only negligable or at least incomplete fibre separation, may be bound into a new shape by the process of the present invention.

It has previously been proposed to form sausage skins from ionic sodium alginate by a process of extruding the sodium alginate into a bath of calcium chloride in order to obtain a set calcium alginate film. This process suffers from three disadvantages; firstly at workable viscosities the high level of hydration in the extrudate leads to great difficulties in drying; secondly the casing does not shrink with the sausage meat such that the cooked sausage has a most unattractive appearance; and thirdly the insolubilising calcium ions in the casing undergo ion exchange with solubilising sodium ions from the meat emulsion, this ion exchange seriously reduces the strength of the casing.

Subsequent workers proposed to incorporate collagen fibres into the calcium alginate films produced by the prior-art process described above. This inclusion of collagen improved the shrinkage characteristics of the sausage casings, however, due to the ionic nature of the alginate material present in the film the problems of ion exchange leading to casing weakness still exist. The presence of an ionic alginate in a dispersion of collagenous material have been found to substantially increase the viscosity of the dispersion; this effect means that it is necessary to work at a low solids content of about 6% in order that the dispersion may be formed into a desired shape prior to setting.

The present invention consists in a method of binding together collagenous materials, comprising the steps of intimately mixing the collagenous materials with an ester of alginic acid; and rendering the mixture sufficiently alkaline for a period of time sufficient to set the mixture.

In another aspect the present invention consists in a method for the formation of articles from a collagenous paste, slurry or dispersion, characterised in that the collagenous material is mixed with an ester of alginic acid and that the mixture is rendered sufficiently alkaline for a period sufficient to effect setting of the mixture.

The use of an ester of alginic acid to bind the collagenous material avoids the problem of ion exchange leading to degradation of the product. The use of the alginic acid ester also results in considerable processing advantages such as the production of a smooth workable mass; the production of a product having a high inherent wet strength; the ability to work at high solids contents thereby reducing the amount of water to be removed from the article on drying; an ability to readily control the degree of contraction of the article, which is important in the production of sausage casings; and an entirely acceptable food product, if this is required.

It has previously been proposed to use alginic acid esters in the formation of gelatinous photographic films in order to increase the melting point of the photographic films. The use of alginic acid esters in films of soluble protein such as gelatin is quite distinct from their use with insoluble proteins such as collagen. The use of the alginic acid esters to raise the melting point of the gelatine would pont away from their use with collagenous materials, particularly for use as sausage casings; collagen undergoes a molecular melting phenomenon which, because the protein is insoluble, is reflected macroscopically as a shrinking phenomenon; when the collagen is used in sausage casings it is impotant that the collagen will shrink during cooking. The fact that alginic acid esters increase the melting point of gelative films would have led workers in the field to the view that the shrinkage temperature of collagen films would be increased, possibly to above boiling point, by the admixture and basification of the collagen with the alginic acid esters. Surprisingly, the present inventor has found that the shrinkage temperature of collagen incorporated into articles according to this invention is substantially equal to the shrinkage temperature of collagen fibres which have not been treated with alginic acid esters.

For the purpose of the present invention collagen from any source and in any degree of subdivision, ranging from the original tissue structure through to the so-called "soluble" collagen (which is molecularly dispersed), and including the heat denatured, but still insoluble, form may be used. If wet strength is to be developed in shaped articles it is generally advantageous that the collagen (a) be in its more highly polymerised, fibrous form with (b) relatively low swelling and (c) be used in relatively concentrated systems. It is particularly advantageous to work at high solids if the product is subsequently to be dried out i.e. it is advantageous to reduce the amount of water to be evaporated from the product to achieve dryness. Fibrous collagen prepared as described in the applicant's copending patent application entitled "A method of producing collagenous dispersions" filed Sept. 10, 1973, Ser. No. 395,994, now U.S. Pat. No. 3,894,132, issued July 8, 1975 is especially suitable for this tissue reconstruction.

The procedure has application with essentially unmodified collagenous tissue e.g. for bonding ribbons together as with the plies of catgut suture and sporting strings, so as to counter the normal tendency for the plies to separate, and fray, upon rewetting after finishing - for example when the suture is implanted, or when racquet strings become damp from rain. Similarly skin damage may be repaired and/or loose fibre anchored in the still-wet condition as during leather manufacture. At an intermediate level, collagenous tissue webs may be loosened by treatments described in the applicant's copending patent application and reshaped with incomplete or insignificant fibre separation to be reset in the new configuration by means of the present procedure.

Propylene glycol alginate (hereinafter referred to as P.G.A.) is a water-soluble polymer used primarily for thickening and stabilising acidic products, particularly foods and cosmetics. The manufacturers state that it is not, practicable to bring about complete esterification of alginic acid and therefore in commercial products up to 10% of the carboxyls remain as free acid, whilst between 10% and 30% of them are neutralised by sodium or calcium ions. The variety of viscosity and degree of esterification grades available are applicable to this patent application. It has been proposed to prepare ethylene glycol and higher homologous glycol derivatives up to and including pentylene glycol alginate. Whilst none of these homologous forms are commercially available (being harder to make hence propylene glycol alginate is the only such ester of commerce), there is no reason to suggest that they would not also be operable in the present context.

As an example of alkyl esters of alginic acid, the methyl ester was prepared using the diazomethane method. When it was mixed with collagen and the mix rendered alkaline, wet strength was created. However, the lubricating and pasting action referred to below was poorer, and the development of wet strength less rapid with the methyl than with the propylene glycol ester. This behavior is due probably to reduced hydrophilicity associated with the more hydrophobic nature of the methyl group in relation to the hydroxypropyl, together with methylation of some of the alginic acids hydroxyl groups.

The propylene glycol ester is the preferred alginic acid ester for use in the present invention.

In trials, no measurable effective lower or upper ratio has been detected for the ratio of alginic acid ester to collagen i.e. in principle essentially all ratios are acceptable. However, it is considered that ratios much higher than 50/50 ester/collagen would be getting away from the concept of the formation of collagenous articles, even in comparison with cartilage, which tends to be relatively high in non-collagenous components. At the other extreme, satisfactory films were prepared using one part of propylene glycol alginate to one hundred parts of collagen, but there is another consideration: it has been found that by taking collagen fibre and progressively adding propylene glycol alginate to it whilst mixing a very useful change in the mix takes place. The collagen fibre prepared as in the copending patent application referred to above has a raggy consistency due to the deliberate creation of conditions promoting fibre separation. As propylene glycol alginate is added the workability of the fibre improves, eventually to yield a self-lubricated, coherent plastic mess which may be drawn or spread readily into coherent films. A consistency and condition is thus achieved which is ideal for moulding shaped articles. The improvement is observed progressively with additions of propylene glycol alginate up to about one-twenty-fifth to one-twentieth of the collagen (dry weight/dry weight basis), beyond this there is a levelling off in improvement. For extrusion or spreading of fibre prepared as in the copending patent application a preferred range of ester/collagen would be one-twentieth - one-fifth, most preferably one-fifteenth - one-tenth. This would be suitable for many purposes, but the ratio required does vary with the character of tissue desired, in the same way that natural connective tissues reflect in their rheological properties the relative proportions of their elemental constituents.

For application to pre-existing tissues one prepares a suitably dilute solution of propylene glycol alginate. For example when bonding catgut ribbons, these are steeped (after chroming or adjustment to pH 4.5 - 7.8) for 15-30 minutes in a dilute solution of propylene glycol alginate, followed by spinning and transferral to dilute sodium carbonate of a concentration conventional in the industry. Alternatively, finely divided or "solubilised" collagen may be incorporated in the P.G.A. solution.

The water content of the system aspect depends to some extent on what is being produced and in what manner. With collagen fibre prepared as in the copending application referred to above it also depends on what forming pressure is to be applied. Other things being equal it is better to work at higher solids concentration because this results in better initial wet strength, and of course if the product is to be dried, in less water removal being required.

A good consistency has been obtained at 11 - 13% solids (collagen plus P.G.A.) using a moderately high viscosity grade of P.G.A. at the 1/10 ratio level and a dispersion produced according to the copending application referred to above. As either the viscosity grade of P.G.A. used or its ratio to collagen is increased, then more water is needed to produce equivalent consistency in the mixed paste, and the converse is true. In general a solids content of between 5% and 20 % is commercially acceptable.

Ambient temperature is normal usage. If one is working with native collagen then the upper limit would be set by thermal demage to this component. The lower limit would be set by freezing of the mix.

The manufacturers of propylene glycol alginate indicate that some saponification and degradation will take place if P.G.A. is made alkaline for even only a short time. The product is sold with a pH in the range 3 – 5 and if for any reason this has to be adjusted slightly upwards we are cautioned by the manufacturer against creating any local alkaline conditions in the solution - in fact "adjustment to a pH of above 6 is not advised". On this basis it would be normal to take collagen at a pH of 6 or less and mix in the acid propylene glycol alginate for subsequent shaping and then setting of the mix in alkali.

It has been usefully and advantageously found that contrary to these indications, the P.G.A./collegen mix can either be stable or unstable in mildly alkaline conditions as is heat indicated by the following description of one experiment. Sodium bicarbonate is a salt producing a pH of about 8.3 in solution; increasing amounts were added to aliquots of P.G.A./collagen previously pasted together under mildly acid conditions. Each aliquot contained: collagen 1.0g P.G.A. 0.1g, water 6g, and the sodium bicarbonate dosage rose: 0.02g; 0.04g; 0.12g; 0.20g; so that there was a tenfold increase from the lower to the upper level. The pH of the resultant mixture in each case was close to 8.2, measured electrometrically both before and after storage for 16 hours. However, the aliquot with the highest level of bicarbonate set to a rubbery solid within 1.5 hours at room temperature, by which time the second highest level was showing signs of firming up, whilst the remaining two were still plastic. After overnight storage the two upper levels were hard, the two lower, still plastic though the higher of these two was showing signs of stiffening. These two lower level samples were individually remeshed, coated out as films and these immersed in 1M sodium sesquicarbonate solution - whereupon both set to form tissues, i.e. residual setting capacity had been retained. In fact the lowest level sample had the best wet strength of any film prepared using any such formulation and was comparable with a natural membrane. Thus pH per se, alone is not what is important, but also the amount of alkaline salt.

This information leads to advantageous ways of carrying out the process. When preparing collagen as in the copending application it is a relatively simple matter to reduce the mashed fibre to a slightly alkaline condition, but reversal of the pH to acid conditions requires additional steps. Contrary to the expectations from P.G.A. manufacturer's data, mixing of unacidified collagen with P.G.A. need not be deleterious, in fact it is advantageous, to product quality. In addition, by creating a state of incipient set in the P.G.A./collagen mix a trigger condition is produced, leading to instantaneous set on further alkalinisation - thus improving both quality and speed of output of products. Again, since there is no residual acid in the mix its passage into solutions of alkali carbonates for setting does not produce carbon dioxide bubbles in the product. Finally, there is less alkali and acid materials usage.

It is not feasible to specify an amount of salt such as sodium bicarbonate or sodium phosphate to be present in the P.G.A./collagen mix at a pH of about 8 for overnight storage prior to shaping and setting. Obviously this will depend on how extensively the collagen fibre has been neutralised and how thorough has been the subsequent washing, together with the reserve acidity of the particular P.G.A. material in use at the time. The setting of such a trigger action (i.e. the speed of set) would be determined by individual control tests.

Examples of the mixing of the collagenous material at a still higher pH with the P.G.A. are given hereunder:-

EXAMPLE A

Sufficient tris(hydroxymethyl) amino methane was added to collagen fibre so that when P.G.A. (1 part solids to 10 parts collagen solids) was mixed in the resultant electrometer pH reading was 9.05.

Film was prepared and immersed in 1 molar sodium sesquicarbonate (pH 9.9); setting took place but wet strength development was not particularly rapid. Such film transferred to 2 molar sodium carbonate solution adjusted to pH 12.0 with sodium hydroxide, set virtually instantaneously and film quality was good.

The remainder of the mix was allowed to stand negligible thickening withint 2 hours after which time some firming was apparent.

EXAMPLE B

Sufficient sodium carbonate solution was incorporated into collagen fibre so that the measured pH following admixture with P.G.A. (1:10 P.G.A.:collagen dry solids ratio) was 9.0. The pH was further increased by rapid tituration of the mix with further sodium carbonate solution, to a measured pH of 9.6. Some thickening was evident within a few minutes but there was sufficient time for films to be prepared; these were placed in 2 molar sodium carbonate solution which had been adjusted to pH 12.0 with sodium hydroxide and setting was so accelerated as to be virtually instantaneous. The films so set had exceptional wet strength.

It is preferred to use carbonic acid/alkali carbonate systems for the formation of products using the methods in these two patent applications i.e. the collagen fibre is adjustable with sodium bicarbonate, the mix may be set in the buffer salt sodium sesquicarbonate. If carbonic acid is used for reneutralisation it is impossible to overshoot and make the tissue too acid.

The relevant considerations in the basification of the mix to achieve setting are pH, ionic strength, buffer capacity, type of base, thickness of the material being set, whether or not calcium is to be removed or aluminium incorporated and time.

a. pH From the previous section it will be recognised that setting can be achieved at a pH as low as 8 by using the appropriate amount of sodium bicarbonate. At the upper pH level, good sets have been achieved using sodium hydroxide solution at a pH of 13.

b. Ionic strength There is a tendency for collagen fibre to swell in dilute alkali if the set is slow. This may be countered by use of an alkaline salt having a high ionic strength.

c. Buffer Capacity A good alkaline buffer will maintain uniformity of treatment throughout processing, a saturated (more than, but essentially 1-molar, ionic strength = 4) solution of sodium sesquicarbonate, which is available as a single crystalline salt, yielding a well buffered pH of just above 10 in solution may advantageously be used for the basification.

d. Type of Base Alkali hydroxides, carbonates, phosphates, are suitable. Sodium carbonate solutions (pH 11.6) gave good results as did tris (hydroxymethyl) amino methane solutions. Ammonia is not suitable.

e. Thickness of Material For volume sets it is generally preferable to use the lower pH, slower set approach, as was involved with the pot setting using sodium bicarbonate described above. With thick sections to be dip set, penetration has to be allowed for, hence well buffered, high ionic strength medium pH solutions are more appropriate. In the case of thin films, the faster the set the better, which means higher pH, high ionic strength.

f. Calcium removal or Aluminium Incorporation If calcium is to be removed then Calgon, pyrophosphate or E.D.T.A. may be incorporated in the setting solution.

For some purposes it can be advantageous to incorporate aluminium in the tissue. It is proposed that this may be done by adding aluminium hydroxide to the ester/collagen mix; if the setting pH is not too high - e.g. with the use of sodium sesquicarbonate, then the aluminium hydroxide is not resolubilised upon basification (i.e. as sodium aluminate) but is retained throughout processing. A separate treatment involving complex formulation could also be used. Alternatively, if it is desired to apply the aluminium after shaping, this can be done quite simply by impregnation at the setting stage through the use of soluble sodium aluminate as a setting solution held at a pH high enough to maintain aluminate solubility, with or without other bases.

g. Time Time required is a function of pH and salts inclusion. With bulk samples or thick sections it is usual to keep the pH down and the time relatively long - it can be a matter of hours. With thin films the faster the set the better and in practice setting has been within only a matter of seconds.

After setting, it is normal to return the pH of the collagenous tissues towards neutrality. This is desirable as the manufacturers of alginates advise that these materials are unstable to storage at pH values above 9.

For present purposes carbonic acid/bicarbonate buffers are ideal as they do not produce effervesence, are effective and are incapable of over-neutralisation. Of course other buffers of suitable pH range may be used.

If the method according to the present invention is to be used in the formation of sausage casings the following special considerations apply:- a. Cooking Shrinkage Edible sausage casings are required to shrink concomitantly with the meat emulsion during cooking and this is why collagen remains the material of choice for such casings. However, manufacturers of reconstituted collagen casings have had considerable trouble achieving the correct degree of contraction, or contraction tension, a problem also experienced with natural casings.

The heat shrinkage tension of membranes formed according to this specification has been found to be a function of the extent (i.e. particularly time) of alkaline treatment given to the collagenous tissue for mash preparation as described in the copending application. Further, some of the collagen fibre prepared may be pre-shrunk for admixture with normal fibres so as to appropriately dilute the density of contraction.

Again, the ratio ester to collagen influences the degree of product shrinkage. Even the water content of the mix at setting provides a controllabel variable in this respect. Any or all of these parameters may be controlled so as to yield the precise degree of shrinkage required of the particular casing during cooking. Aluminium incorporation also influences shrinkage.

b. Aluminium Incorporation Aluminium "tawing" is a traditional method for making white leathers, - i.e. for decreasing the water absorption and increasing the water resistance of dried hide collagen. Others have designed complex aluminium salt systems in an endeavour to impart permanent wet-resistance in their reconstituted collagen sausage casings. Collagenous membranes prepared according to the procedures of this invention have good wet strength, but are still tissues, and as with the tawing of hide it may be desired to further increase product stability by incorporating aluminium. An extremely simple technique has been devised: aluminium hydroxide, being insoluble between pH 4 and 10.4, is incorporated in the P.G.A./collagen mix, and providing basification is carried out using sodium sesquicarbonate for example, aluminium is not leached from the product, and also can be retained during appropriate reneutralisation. Not only does the aluminium "hydrate" interact with the collagen during drying out, but also with alginate carboxyl groups thus forming a coherent matrix.

Alternatively, if aluminium hydroxide is not included in the mix, it can be introduced as soluble sodium aluminate, with or without other alkali to maintain the pH above 10.4 - e.g. sodium carbonate.

c. Techniques In sit formation of the casing as a coating on the sausage as the latter is produced has been proposed in the literature. It will be evident that this can be done using the P.G.A./collagen system.

d. Plasticisation An oil may be incorporated in the original collagen composition, to be carried right through the process, ending up in dried preparations. In these, it has a plasticising action and improves the transparency of films.

Hereinafter given by way of exemplification only are preferred examples of the method according to the present invention.

EXAMPLE I

Using a pasting action, propylene glycol alginate (P.G.A.) was added progressively as a 60 mesh powder, to collagen fibre of essentially 1 cm staple length prepared according to the process of the applicant's copending patent application entitled "A method of forming collagen dispersions" so as to produce a ratio of dry solids of one part of P.G.A. to 10 parts collagen. The original collagenous material had a raggy consistency, but as the P.G.A. was progressively added and worked in, a coherent plastic mass was produced, being ideally suited to spreading and shaping. The total solids content was 12.5%.

When properly worked to a smooth consistency the paste was spread without difficulty as a thin coherent film on 60 mesh stainless steel gauze as support. At this stage the mixture was a malleable paste. The film and its support were then immersed in a 1-molar solution of sodium sesquicarbonate, and in a matter of seconds the edge of the previously malleable paste could be peeled down as part of an integral film i.e. a tissue had been produced. The sesquicarbonate exposure was continued for five minutes, and was followed by transfer of film plus support to pH 5.5 buffer for film neutralisation, which was taken as complete in five minutes. Then the film was peeled off its support and put into a large volume of distilled water for salts removal; it remained quite stable and integral as a tissue under these demanding conditions. Finally the membranous film was replaced onto the screen and dried in a current of warm air, to yield a strong, translucent, glassine paperline sheet one thousandth of an inch in thickness. Upon transfer to water at 65° C, the film underwent hydrothermal contraction, and became more elastic although remaining strong.

EXAMPLE II

P.G.A./collagen paste as in the previous example was coated onto a cylindrical surface and set, neutralised and washed on the cylinder. The membrane produced could be peeled and pulled down like a stocking, thus demonstrating the powerful development of wet strength.

EXAMPLE III

Before mixing with P.G.A., collagen fibre as in Example I was heated briefly at 60° C to induce contraction and quickly cooled. A film prepared as in Example I was more elastic when wet, but quite strong, and dried out to a strong, translucent sheet. No shrinkage was observed upon its immersion in water at 65° C.

EXAMPLE IV

Dried limed splits (an article of commerce) were treated with 3% sodium hydroxide solution for two days; after draining and mincing the minced alkaline tissue was stored in the body of a refrigerator for 12 weeks. Mashing and neutralisation was carried out in the manner described in the copending application to produce good quality, discrete collagen fibres. These fibres were processed into membranous film as in Example I. In this case the film showed negligible contraction when placed in water at 65°.

EXAMPLE V

A dried limed split was treated with 2% sodium hydroxide for 5 days and the alkali removed, as described in the copending application. The resultant raggy, fibrous collagen fabric was increased in area by stretching, without any cutting of the fibres and without completely separating them. The enlarged and thinned fabric was soaked in an 0.5% solution of propylene glycol alginate until fully penetrated by it; next the surface excess of alginate was slicked off and the sheet transferred to sodium sesquicarbonate solution. At equilibrium the collagenous tissue had been reconstituted and reset in its new shape. The product appeared, felt and behaved as a tissue, in direct contrast with the intermediate collagen feltwork.

EXAMPLE VI a. to collagen prepared as described in the applicant's copending application was added freshly prepared aluminium hydroxide in amounts equivalent to 2.5 - 5.0 mg of aluminium metal per gram of dry collagen. The 0.1g dry weight of propylene glycol alginate per gram dry weight of collagen was mixed in. Films were prepared and set in sodium sesquicarbonate as described in Example I. After neutralisation in pH 6.5 buffer, the films were soaked in excess distilled water to remove salts, and air dried.

In comparison with control films without aluminium hydroxide the shrinkage temperature was unchanged but free area shrinkage on exposure to 65° C in water for three minutes was doubled.

b. a mixture of one part propylene glycol alginate and ten parts of collagen was prepared and spread into films as described in Example I. To prepare one setting solution, aluminium nitrate was dissolved in water and sufficient 60% sodium hydroxide and water added to render the final solution 0.8 M in respect of aluminium and at a pH of 12.0. One control setting solution was prepared from 2M sodium carbonate adjusted to pH 12.0 with sodium hydroxide, for the other 1M sodium sesquicarbonate was used. After immersion for five minutes in their respective setting solutions, film samples were surface rinsed in water, soaked for five minutes in pH 6.4 buffer and finally leached with distilled water, before air drying.

When tested in heated water, the aluminium-treated sample had a shrinkage temperature 5% higher than the controls (both of which were equivalent) and the free area shrinkage on contraction was twice that of the controls.

EXAMPLE VII a. Olive oil, 6% by weight on the dry weight of collagen was mixed into a wet collagen dispersion prepared as described in the copending application before incorporation of P.G.A. The latter was next added, at a dry solids ratio to collagen of 0.7/10. Films were spread, then set, finished and dried as in Example 6b.

b. A P.G.A./collagen paste was prepared as in Example I, then 9% of olive oil on dry collagen solids, stirred in until completely absorbed. Films were spread, set, finished and dried as in Example I.

In both cases (a) and (b) the dried products were more flexible and transparent than controls prepared without oil incorporation. There was no surface greasiness. When samples were interleaved between sheets of lightweight white paper and stored in direct contact with them, no transfer of oil took place.

I claim:
1. A method for the formation of a water soluble collagenous article comprising the steps of:
   mixing the collagenous paste, slurry or dispersion with an ester of alginic acid selected from the group consisting of water dispersable alkylene glycols up to pentylene glycol and methyl ester, the ester being present in a weight ratio of from about 1:25 to about 1:5 relative to the collagenous material on a dry weight basis, and the mixture having a solids content of from about 5% to about 20% by weight to produce a coherent plastic mass;
   forming the mixture into the shape of the article to be formed;
   increasing the pH of the mixture to render it sufficiently alkaline that setting of the mixture is obtained when an increased pH in alkaline range is maintained, the increase in pH being obtained by using an alkali capable of effecting such setting without the necessity of drying to effectively reform a collagen article having the desired shape in which the collagen fibers are bound together by the alginate ester, and
   maintaining the mixture at the increased pH until the mixture is set.
2. A method as claimed in claim 1 in which the collagenous paste, slurry or dispersion and the alginic acid ester are mixed together at a pH below 9.7 but not low enough to be more than mildly acidic.
3. A method as claimed in claim 1 wherein the collagenous paste, slurry or dispersion and the alginic acid ester are mixed together at a pH between 8 and 9.7.
4. A method as claimed in claim 1 in which the forming step comprises extrusion.
5. A method as claimed in claim 1 in which the mixture of the alginic acid ester and the collagenous mate- rial contains a solids content of from 11 to 13% by weight.

6. A method as claimed in claim 1 in which the mixture of alginic acid ester and collagenous material includes, for the purpose of adjusting the pH of the mixture, a member selected from the group consisting of sodium bicarbonate, sodium phosphate, sodium carbonate, tris (hydroxy methyl) amino methane and mixtures thereof.

7. A method as claimed in claim 1 in which the mixture of alginic acid ester and collagenous material includes, for the purpose of "tawing" the set article, a powdered aluminum salt not soluble in the mixture.

8. A method as claimed in claim 1 in which the mixture of alginic acid ester and collagenous material includes, as a plasticiser, an oil.

9. A method as claimed in claim 1 in which the ester of alginic acid is selected from the group consisting of propylene glycol alginate and methyl alginate.

10. A method as claimed in claim 1 in which the pH of the mixture is increased by treatment with a solution of a member selected from the group consisting of alkali hydroxides, carbonates, bi-carbonates, sesquicarbonates, phosphates and mixtures thereof.

11. A method as claimed in claim 9 in which the pH of the solution is above 10.4 and in which the solution contains aluminate ions.

12. A method as claimed in claim 10 in which, for the purpose of removing calcium ions from the material being set, the solution includes at least one member selected from the group consisting of, polyphosphates, a pyrophosphate, E.D.T.A. and mixtures thereof.

13. A method as claimed in claim 1 in which the set material is neutralised.

14. A method as claimed in claim 13 in which the neutralisation is effected with a solution of a carbonic acid/bicarbonate buffer.

15. A method as claimed in claim 1 in which at least a part of the collagenous material is preshrunk.

16. An article formed by a process as claimed in claim 1.

17. An article as claimed in claim 16 in which the article is a sausage casing.

18. A sausage casing as claimed in claim 17 in which the casing is formed in situ on a sausage.

19. A method as claimed in claim 3 in which the forming step comprises casting.

20. A method as claimed in claim 1 in which the alginic acid ester and the collagenous material are present in the mixture thereof in a weight ratio of 1:15 to 1:10.

21. A method for the formation of a water insoluble collagenous article comprising the steps of:
forming an aqueous paste, slurry or dispersion of water insoluble collagen fibers;
mixing the collagenous paste, slurry or dispersion with an ester of alginic acid selected from the group consisting of water dispersable alkylene glycols up to pentylene glycol and methyl ester, the ester being present in a weight ratio of from about 1:100 to about 50:50 relative to the collagenous material on a dry weight basis, and the mixture having a solids content of from about 5% to 20% by weight to produce a coherent plastic mass;
forming the mixture into the shape of the article to be formed;
increasing the pH of the mixture to render it sufficiently alkaline that setting of the mixture is obtained when an increased pH in the alkaline range is maintained, the increase of the pH being obtained by using an alkali capable of effecting such setting without the necessity of drying to effectively reform a collagen article having the desired shape in which the collagen fibers are bound together by the alginate ester and
maintaining the mixture at the increased pH until the mixture is set.

22. A method for the formation of a water insoluble sausage casing comprising the steps of:
forming an aqueous paste, slurry or dispersion of water insoluble collagen fibers;
mixing the collagenous paste, slurry or dispersion with an ester of alginic acid selected from the group consisting of water dispersable alkylene glycols up to pentylene glycol and methyl ester, the ester being present in a weight ratio of from about 1:20 to about 1:5 relative to the collagenous material on a dry weight basis, and the mixture having a solids content of from about 5% to 20% by weight to produce a coherent plastic mass;
forming the mixture into the shape of a sausage casing;
increasing the pH of the mixture to render it sufficiently alkaline that setting of the mixture is obtained when an increased pH in the alkaline range is maintained, the increase of the pH being obtained by using an alkali capable of effecting such setting without the necessity of drying to effectively reform a collagen article having the desired shape in which the collagen fibers are bound together by the alginate ester, and
maintaining the mixture at the increased pH until the mixture is set.

23. The method of claim 1 wherein the plastic mass has a solids content of about 11%–13% and the ester is present at a weight ratio of about 1:10 to about 1:15 relative to the collagenous material.

24. The method of claim 23 further including the step of neutralizing the pH of the sausage casing after setting is obtained.

25. The method of claim 22 wherein the aqueous paste, slurry or dispersion is at a pH between 7 and about 9.7 before it is mixed with said ester.

26. The method of claim 22 wherein the aqueous paste, slurry or dispersion is mildly acidic before it is mixed with said ester.

27. The method of claim 22 wherein the pH is increased by immersing the formed mixture in an alkaline solution.

28. The method of claim 27 wherein the alkaline solution has a high ionic strength.

29. A method for the formation of a water insoluble collagenous article comprising the steps of:
forming an aqueous paste, slurry or dispersion of water insoluble collagen fibers;
mixing the collagenous paste, slurry or dispersion with an ester of alginic acid selected from the group consisting of water dispersable alkylene glycols up to pentylene glycol and methyl ester, the ester being present in a weight ratio of from about 1:25 to about 1:5 relative to the collagenous material on a dry weight basis and having a solids content of about 5% to about 20% by weight to produce a coherent plastic mass;
increasing the pH of the mixture to render it sufficiently alkaline that setting of the mixture is obtained when an increased pH in the alkaline range is maintained, the increase of the pH being obtained by using an alkali capable of effecting such setting without the necessity of drying to effectively reform a collagen article having the desired shape in which the collagen fibers are bound together by the alginate ester;

forming the plastic mass into the shape of the article to be formed; and maintaining the plastic mass more alkaline until the plastic mass has set in the shape formed.

30. The method of claim 29 wherein the plastic mass has a pH of at least 7.

31. The method of claim 30 wherein the plastic mass is rendered more alkaline using an alkaline material having a high ionic strength.

32. The method of claim 30 wherein the alkaline material is sodium bicarbonate.

* * * * *

UNITED STATES PATENT OFFICE
CERTIFICATE OF CORRECTION

Patent No. 4,041,183          Dated August 9, 1977

Inventor(s) Leonard Daniel

It is certified that error appears in the above-identified patent and that said Letters Patent are hereby corrected as shown below:

Column 10, line 34, "soluble" should be --insoluble--.

Signed and Sealed this

Second Day of May 1978

[SEAL]

Attest:

RUTH C. MASON
Attesting Officer

LUTRELLE F. PARKER
Acting Commissioner of Patents and Trademarks